United States Patent [19]

Haraguchi et al.

[11] Patent Number: 4,699,106

[45] Date of Patent: Oct. 13, 1987

[54] KNOCK CONTROL SYSTEM FOR INTERNAL COMBUSTION ENGINES

[75] Inventors: Hiroshi Haraguchi, Kariya; Koji Sakakibara, Hekinan, both of Japan

[73] Assignee: Nippondenso Co., Ltd., Kariya, Japan

[21] Appl. No.: 853,340

[22] Filed: Apr. 17, 1986

[30] Foreign Application Priority Data

Apr. 18, 1985 [JP] Japan .................................. 60-83313

[51] Int. Cl.$^4$ .............................................. F02P 5/14
[52] U.S. Cl. ................................. 123/425; 123/435; 73/35
[58] Field of Search ..................... 123/425, 435; 73/35

[56] References Cited

U.S. PATENT DOCUMENTS

| | | | |
|---|---|---|---|
| 4,354,378 | 10/1982 | Oshiage et al. ................ | 123/425 X |
| 4,356,551 | 10/1982 | Iwase et al. ..................... | 123/425 X |
| 4,481,925 | 11/1984 | Karav et al. .......................... | 123/425 |
| 4,565,171 | 1/1986 | Sugiura et al. ..................... | 123/425 |
| 4,583,175 | 4/1986 | Abe et al. .......................... | 123/425 X |
| 4,617,895 | 10/1986 | Sakakibara et al. ................ | 123/425 |

FOREIGN PATENT DOCUMENTS

| | | |
|---|---|---|
| 0046606 | 4/1976 | Japan . |
| 0115861 | 9/1981 | Japan . |
| 0007538 | 1/1983 | Japan . |
| 0180766 | 10/1983 | Japan . |

Primary Examiner—Willis R. Wolfe, Jr.
Attorney, Agent, or Firm—Cushman, Darby & Cushman

[57] ABSTRACT

A knock control system for an internal combustion engine has a knock discrimination level. If an output signal from a knock sensor is higher than the knock discrimination level, then the knock control system determines that the engine is subjected to knock and retards the ignition timing. If the knock sensor output signal is lower than the knock discrimination level, i.e., if no knock or detonation is detected over a prescribed period of time, then the ignition timing is advanced. At least two corrective levels are established for comparison with a knock discrimination level, and occurrences in which the maximum value of the output signal from the knock sensor exceeds the corrective levels. The knock discrimination level is automatically corrected dependent on the counts of such occurrences.

7 Claims, 9 Drawing Figures

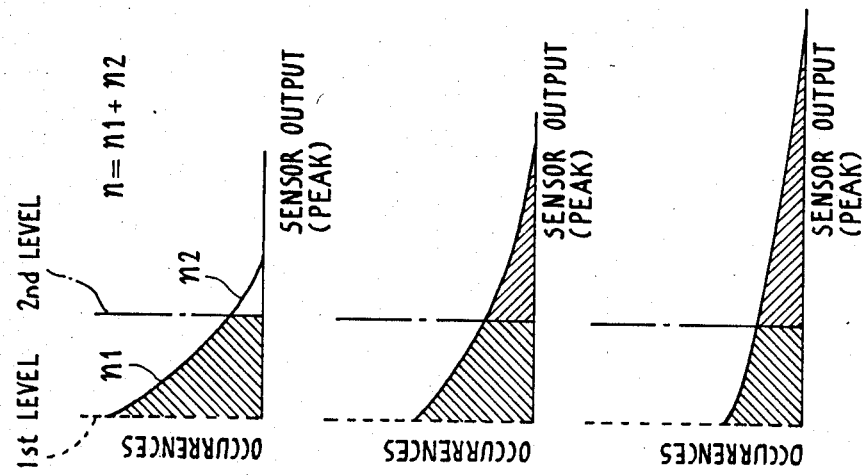
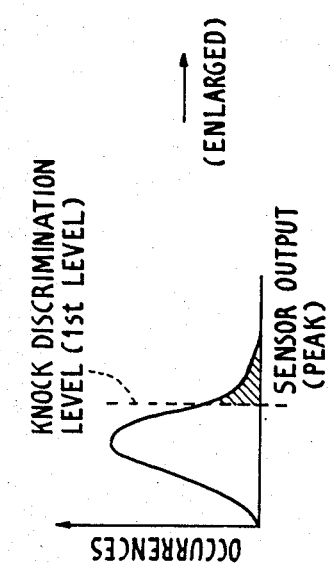
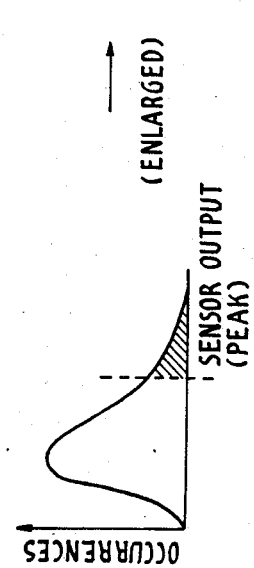
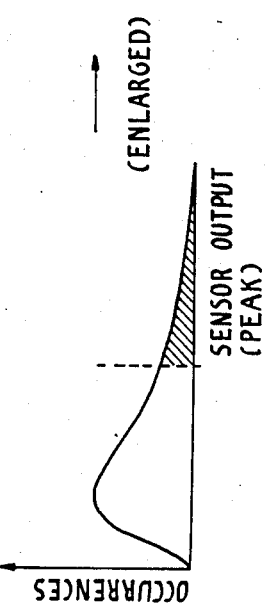
FIG. 2A  FIG. 2B  FIG. 2C

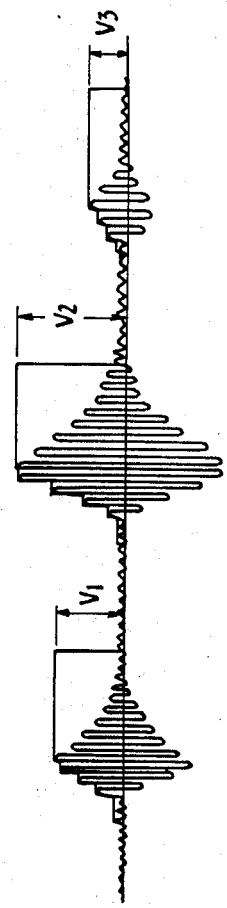
FIG. 4A
FIG. 4B
FIG. 4C

KNOCK CONTROL SYSTEM FOR INTERNAL COMBUSTION ENGINES

BACKGROUND OF THE INVENTION

The present invention relates to a knock control system for controlling a knock controlling factor such as an ignition timing, a boost pressure, an air-fuel ratio, an amount of exhaust gas sent back in an EGR system, or the like in accordance with the condition in which a knock is produced in an internal combustion engine.

Knock control systems generally include a knock sensor for detecting vibration of an internal combustion engine. If an electric signal produced by the knock sensor is in excess of a certain level (hereinafter referred to as a "knock discrimination level"), then the knock control system determines that the engine is subjected to knock and retards the ignition timing. Conversely, if the electric signal from the knock sensor is below the knock discrimination level, i.e., if no knock or detonation is detected over a prescribed period of time, then the ignition timing is advanced. In this manner, the knock control system controls the ignition timing to be kept close to a critical point beyond which knock would be produced, thereby improving the fuel economy and power output capability of the engine. Japanese Laid-Open Patent Publication No. 58-7538 published on Jan. 17, 1983 discloses an improved knock control system for more accurately detecting knock based on a ratio of knocking signals. Reference should also be made to Japanese Laid-Open Patent Publication Nos. 51-46606 published on Apr. 21, 1976, 56-115861 published on Sept. 11, 1981, and 58-180766 published on Oct. 22, 1983, for example, for other conventional knock control systems.

The knock discrimination level is of great importance in the proper operation of the knock control system. If the knock discrimination level were too high, knock that is actually produced would not be detected and the ignition timing or spark would be advanced. As a result, the engine would knock many times and lead to damage. If the knock discrimination level were too low, the spark would be retarded regardless of the fact that no knocking occurs, preventing the engine from generating enough power output.

It has been conventional practice to establish an appropriate knock discrimination level as by applying the knock sensor signal to an integrating circuit, multiplying the output signal from the integrating circuit by a constant K (hereinafter referred to as a "K value") closely commensurate with the engine speed, and adding an offset voltage to the product.

However, since engine blocks or other engine components are susceptible to different manufacturing errors from engine to engine even if the engines are of the same design, the knock discrimination levels of some eigines may not be appropriate and no accurate knocking may be detected regardless of a closely matched K value.

Therefore, establishing the knock discrimination level for the prior knock control systems has required the close matching of a K value, and has been disadvantageous in that accurate knocking detection is rendered impossible by engine manufacturing errors.

SUMMARY OF THE INVENTION

In view of the aforesaid drawbacks of the conventional knock control system, it is an object of the present invention to provide a knock control system capable of automatically correcting a knock discrimination level for thereby accurately detecting knock regardless of engine manufacturing errors and changes due to aging in engine operation.

According to the present invention, as shown in FIG. 1 of the accompanying drawings, a knock control system for use with an internal combustion engine I comprises a knock sensor A for detecting knock produced by the internal combustion engine, knock discriminating means F for discriminating knock based on an output signal from the knock sensor, processor means H responsive to the result of knock discrimination for computing a control value to control a knock control factor for the internal combustion engine and for changing the knock control factor according to the computed control value, detector means B for detecting the maximum value V of the output signal from the knock sensor during a prescribed period, discrimination level setting means E for setting a knock discrimination level for use in the knock discriminating means, corrective level setting means D for setting at least two corrective levels to correct the knock discrimination level set by the discrimination level setting means, comparator/counter means C for comparing the maximum value V of the output signal of the knock sensor with the at least two corrective levels and counting occurrences in which the maximum value exceeds the corrective levels, and level correcting means F for correcting the knock discrimination level dependent on the counts of such occurrences.

With the above arrangement, at least two corrective levels are established for comparison with a knock discrimination level, and occurrences in which the maximum value of the output signal from the knock sensor exceeds the corrective levels. The knock discrimination level is automatically corrected dependent on the counts of such occurrences. Therefore, accurate knock control can be achieved irrespective of engine manufacturing errors and changes due to aging in engine operation.

BRIEF DESCRIPTION OF THE DRAWINGS

The present invention will be described in detail by way of illustrative example with reference to the accompanying drawings, in which;

FIGS. 2A through 2C are graphs showing distribution patterns explanatory of the principles of the present invention;

FIGS. 4A through 4C are diagrams showing the waveforms of a knock sensor output signal, a rectified signal, and an integrated signal.

DETAILED DESCRIPTION

Figure 1:
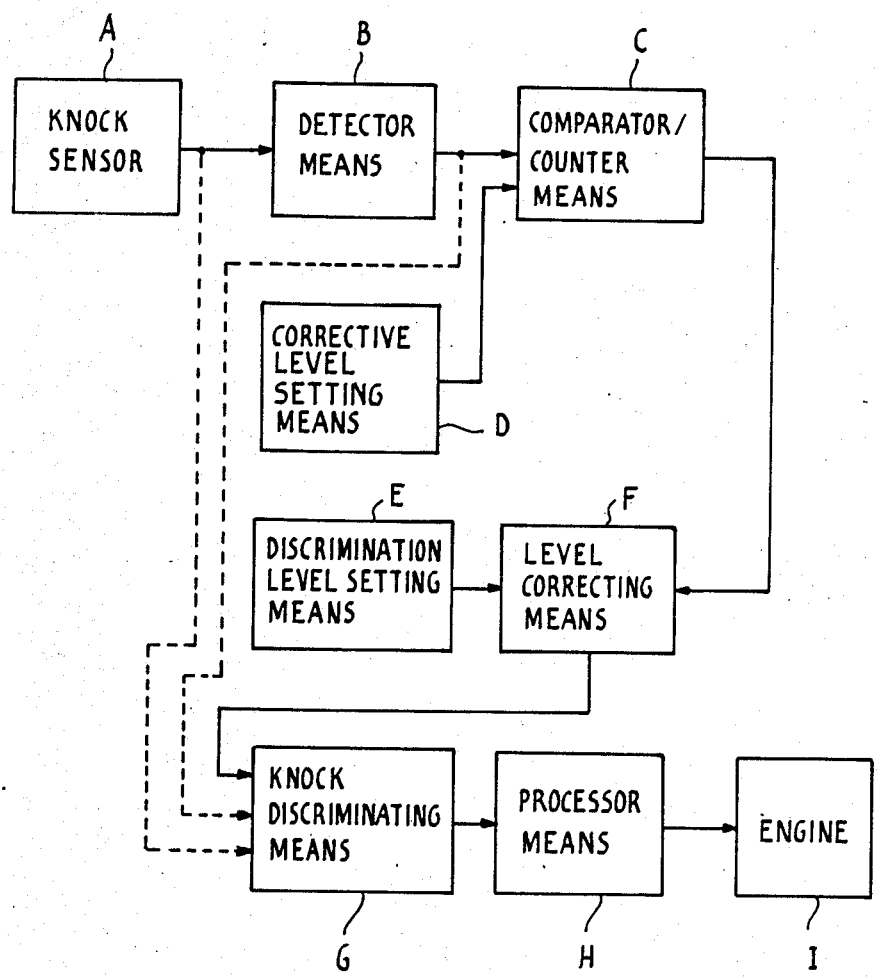
FIG. 1 is a block diagram of a knock control system according to the present invention, represented as a combination of functional blocks.
Figure 3:
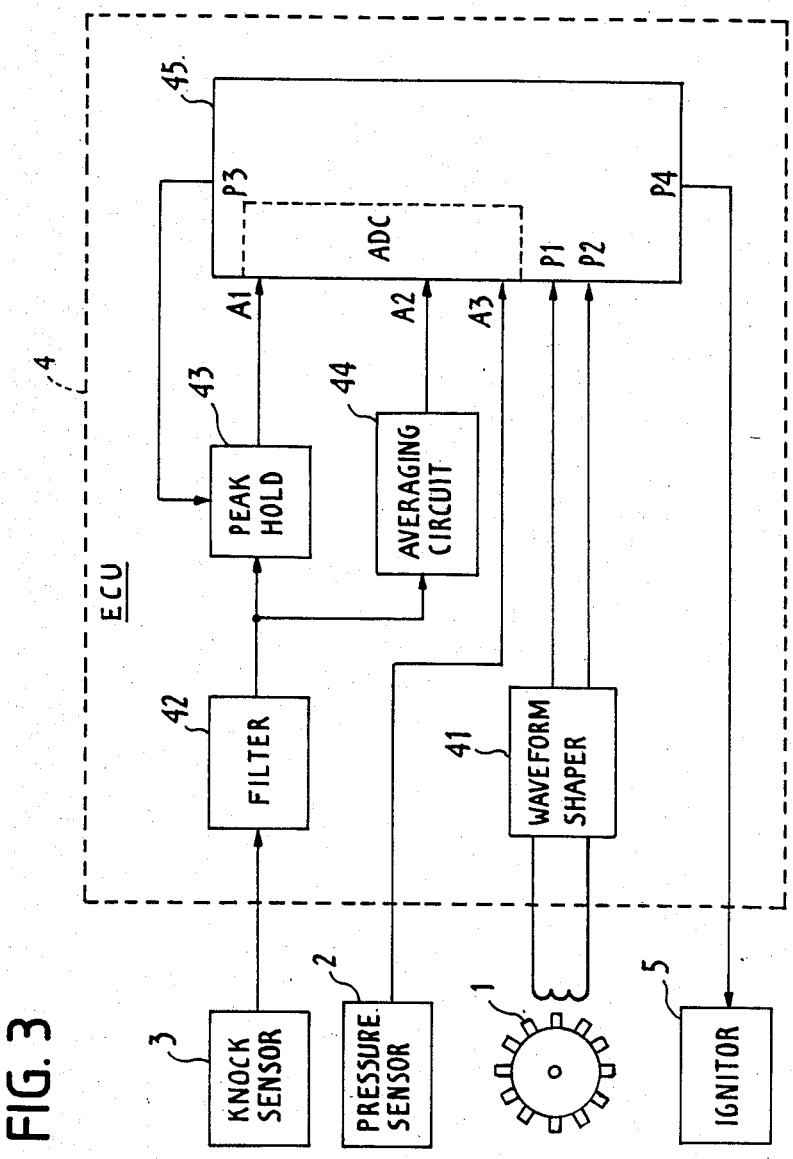
FIG. 3 is a block diagram of the knock control system according to the present invention.

As shown in FIG. 3, a knock control system according to the present invention includes an angle sensor 1 comprising a magnetic pickup, for example, for producing information as to the rotational speed and reference angle of an internal combustion engine (not shown) to be controlled, a pressure sensor 2 for producing information as to the pressure in the intake manifold of the engine, a knock sensor 3 comprising a piezoelectric element mounted on the cylinder block of the engine for detecting knock of the engine, an electronic control unit (ECU) 4 responsive to the information from the sensors 1, 2, 3 for controlling the ignition timing of the engine, and an ignitor 5 responsive to a control signal from the ECU 4 for supplying and cutting off a primary ignition coil current.

The ECU 4 includes an 8- or 12-bit microcomputer 45, a waveform shaper 41 for shaping the waveform of the output signal from the angle sensor 1 to supply the microcomputer 45 with information about the rotational speed of the engine (for example, a signal produced at each 30° CA) and information about the reference angle of the engine (for example, a signal produced each time the piston in the first engine cylinder reaches a 10° CA position before the top dead center, a filter 42 in the form of a bandpass filter or the like for extracting a signal of a certain frequency range (generally from 7 to 8 kHz) from the output signal from the knock sensor 3, a peak-hold circuit 43 for holding the peak value of the output signal of the filter 42 to produce a maximum signal value in a prescribed engine angle range for each ignition, and an averaging circuit 44 for rectifying and integrating the output signal of the filter 42 through half-wave rectification to produce a signal indicative of the average value of the output signal of the knock sensor 3.

The microcomputer 45 has an input/output device including digital ports P1, P2, P3, P4, . . . for receiving and issuing digital signals, i.e., signals of 0 and 1 logic levels, and A/D converter ports A1, A2, A3, . . . for converting analog signals to digital signals. The output signals from the waveform shaper 41 (i.e., the reference angle signal and the rotational angle signal) are applied to the digital ports P1, P2, respectively. The output signals from the peak-hold circuit 43, the averaging circuit 44, and the pressure sensor 42 are applied to the A/D converter ports A1, A2, A3, respectively. The digital port P3 is used for resetting the peak-hold circuit 43 for each ignition, and the digital port P4 is used for controlling the ignitor 5.

An ignition control system for electronically controlling the ignition timing in response to information on the rotation of an engine and information on the pressure in an intake manifold of the engine is generally known as an electronic spark-advance system. Operation of the knock control system according to the present invention will be described hereinbelow.

FIG. 4A shows the output signal of the knock sensor 3 as it has passed through the filter 42, the view also showing peak values V1, V2, V3 held by the peak-hold circuit 43. The peak-hold circuit 43 is controlled by the microcomputer 45 to start holding a peak of the knock sensor output signal at an about 10° CA position after the top dead center, and to be reset at about 90° CA position after the top dead center. The peak values V1, V2, V3 immediately before the peak-hold circuit 43 is reset by the microcomputer 45 are supplied to the microcomputer 45. Thus, the maximum value of the knock sensor output signal during the prescribed period (for example, from the 10° CA position to the 90° CA position after the top dead center) for each ignition is supplied to the microcomputer 45 through the A/D converter.

FIG. 4B illustrates a signal receified by the half-wave rectifier in the averaging circuit 44. FIG. 4C shows a signal produced by integrating the rectified signal with the integrator in the averaging circuit 44. The signal of FIG. 4C is therefore a voltage signal substantially representing the average value of the output signal from the knock sensor 3. The microcomputer 45 converts the average signal to a corresponding digital signal at a certain timing (about 10° CA in the illustrated embodiment). The digital signals thus produced are introduced as v1, v2, v3 (FIG. 4C) into the microcomputer 45 and will be used to establish knock discrimination levels.

Figure 5:
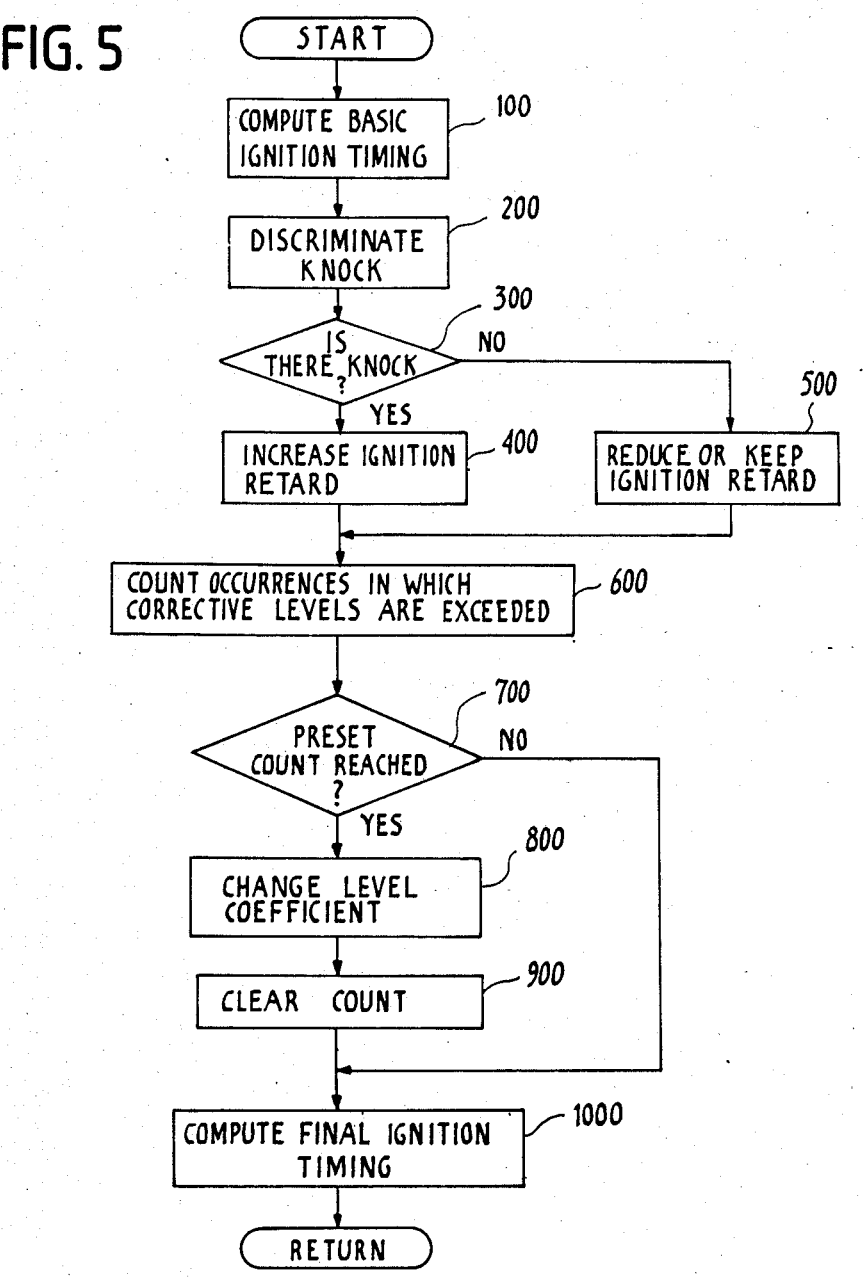
FIG. 5 is a flowchart of successive steps of an operation sequence of an electronic control unit in the knock control system of the present invention.

The operation of the knock control system of the invention will be described in detail with reference to the flowchart of FIG. 5. The knock control system initiates a programmed control sequence by computing a basic ignition timing from the information on the rotational speed of the engine and the information on the intake pressure in a step 100, which is followed by a step 200 that ascertains whether there is engine knock on each ignition. Engine knock is checked by ascertaining whether the knock sensor output signal has exceeded a knock discrimination level. The knock discrimination level is prepared as the product of an average knock sensor signal v (FIG. 4C) and a certain constant K (which is automatically corrected as described later on). The knock sensor output signal to be compared with the knock discrimination level is the peak value V (FIG. 4A). When the peak value V is in excess of the knock dicrimination level K·v, then the engine is judged as knocking. When the peak value V is not in excess of the knock discrimination level K·v, then the engine is judged as not knocking. If it is found in a step 300 that there is engine knock in the present ignition cycle, then the program proceeds to a step 400 which increases an ignition retard R from the basic ignition timing by $\Delta R$ (generally in the range of from about 0.5 to 1° CA). If there is no knock in the step 300, then the program goes to a step 500 which reduces the ignition retard R ($R = R - \Delta R$) if the number of consecutive knock-free ignition cycles reaches a predetermined number, and keeps the ignition retard R otherwise.

Then, the program goes to a step 600 which collects data to correct the knock discrimination level by counting occurrences in which the present knock sensor output signal V (peak value) exceeds at least two corrective threshold levels (hereinafter referred to as first and second corrective levels, respectively). The first corrective level which is lower is the same as the knock discrimination level, and the second corrective level which is higher is prepared as a function of the knock discrimination level or the average value v of the knock sensor output signal. Thus, the first corrective level is equal to K·v (= knock discrimination level), and the second corrective level is equal to a x K·v (= knock discrimination level multiplied by a). The value of a is preferably in the range of from 1.2 to 1.8. In the present embodiment, there are different knock discrimination levels for the respective engine cylinders so that knock of all of the engine cylinders can be detected accurately.

Accordingly, there are four knock discrimination levels for a four-cylinder engine which are indicated as K1·v, K2·v, K3·v, K4·v, respectively, and hence there are four corrective levels a·Ki·v (i=1 to 4).

The step 600 thus counts occurrences in which the knock sensor output signal exceeds the first and second corrective levels for each engine cylinder, the counts being indicated by ni, n2i (i=1 to 4 for a four-cylinder engine), respectively. The count n2i is contained in the count ni since when the knock sensor output signal exceeds the second corrective level (higher level), it naturally exceeds the first corrective level (lower level). If the number of occurrences in which the knock sensor output signal exceeds the first corrective level but does not exceeds the second corrective level is n1i, then ni=n1i+n2i.

Thereafter, the program goes to a step 700 which ascertains whether the count ni has reached a preset count. If not, then the knock discrimination level is not corrected since a sufficient number of corrective data items are not present, and the program jumps to a step 1000 (described later). If the count ni has reached the preset count in the step 700, then the program goes to a step 800 for correcting the knock discrimination level in the following manner:

If n2i/ni is equal to or larger than a prescribed value A, engine knock is judged as being too large (FIG. 2C), and a coefficient ki for the knock discrimination level is reduced by Δki, thus lowering the knock discrimination level. If n2i/ni is equal to or smaller than a prescribed value B, engine knock is judged as being too small (FIG. 2A), and the coefficient ki is increased by Δki. If B<n2i/ni<A, engine knock is judged as being appropriate, and the coefficient ki is kept as it is. Since the above decision step is effected when the count ni reaches the preset value in the present embodiment, the count ni remains the same value. Therefore, only n2i may be compared with prescribed values A' and B'.

When the engine is in a transient condition in which the knock sensor output signal abruptly changes, the knock discrimination level is not corrected in the step 800 in order to increase the accuracy of correction of the knock discrimination level. More specifically, when such an engine transient condition is detected by an engine sensor, the counts ni, n2i are cleared to zero, clearing all data items obtained thus far.

The program then proceeds from the step 800 to a step 900 which clears the counts in preparation for collection of corrective data in a next cycle. The step 900 is followed by a step 1000 in which the computed ignition retard R is subtracted from the basic ignition timing to provide a final ignition timing.

Then, the program returns to the step 100 for repeating the aforesaid cycle.

In the above embodiment, the ignition timing has been used as a knock control factor. However, a boost pressure of a turbocharged engine, the rate of injected fuel, the air-fuel ratio, the amount of an exhaust gas sent back in an EGR system, or the like may also be used as a knock control factor.

While the knock discrimination level is used as the first corrective level in the above description, the first corrective level may be of another level. In this case, such another level used as the first corrective level may preferably be lower than the knock discrimination level whereas the second corrective level may preferably be higher than the knock discrimination level. Alternatively, the knock discrimination level may be used as the second corrective level, and the first corrective level may be lower than the knock discrimination level. In addition to the first and second corrective levels, third, fourth, and more corrective levels may be employed for higher level correction accuracy. However, use of the two corrective levels, one equal to the knock discrimination level, is most practical and sufficient in practice.

Although a certain preferred embodiment of the present invention has been shown and described in detail, it should be understood that various changes and modifications may be made therein without departing from the scope of the appended claims.

We claim:

1. A knock control system for use with an internal combustion engine comprising:
    a knock sensor for detecting knock produced by the internal combustion engine;
    knock discriminating means for discriminating knock based on an output signal from said knock sensor;
    processor means responsive to the result of knock discrimination for computing a control value to control a knock control factor for the internal combustion engine and for changing the knock control factor according to the computed control value;
    detector means for detecting a maximum value of the output signal of said knock sensor during a prescribed period;
    discrimination level setting means for setting a knock discrimination level for use in said knock discriminating means;
    corrective level setting means for setting at least two corrective levels to correct said knock discrimination level set by said discrimination level setting means;
    comparator/counter means for comparing said maximum value of the output signal of said knock sensor with said at least two corrective levels and counting occurrences in which said maximum value exceeds said corrective levels; and
    level correcting means for correcting said knock discrimination level dependent on the counts of such occurrences.

2. A knock control system according to claim 1, wherein said knock discrimination level and said corrective levels are established for each engine cylinder of said internal combustion engine.

3. A knock control system according to claim 1, wherein one of said corrective levels is equal to said knock discrimination level.

4. A knock control system according to claim 3, wherein said knock discrimination level and said corrective levels are established for each engine cylinder of said internal combustion engine.

5. A knock control system according to claim 1, wherein said knock discrimination level is prepared by multiplying an average value of the output signal from said knock sensor by a coefficient, said knock discrimination level being corrected by changing said coefficient.

6. A knock control system according to claim 5, wherein said coefficient is reduced when a ratio of said counts is larger than a prescribed value.

7. A knock control system according to claim 5, wherein said coefficient is increased when a ratio of said counts is smaller than a prescribed value.

* * * * *